(12) United States Patent
Schilling et al.

(10) Patent No.: US 11,077,700 B2
(45) Date of Patent: Aug. 3, 2021

(54) MULTILAYER BODY

(71) Applicant: OVD Kinegram AG, Zug (CH)

(72) Inventors: Andreas Schilling, Hagendorn (CH); Wayne Robert Tompkin, Baden (CH); Achim Hansen, Zug (CH)

(73) Assignee: OVD KINEGRAM AG, Zug (CH)

( * ) Notice: Subject to any disclaimer, the term of this patent is extended or adjusted under 35 U.S.C. 154(b) by 175 days.

(21) Appl. No.: 15/977,621

(22) Filed: May 11, 2018

(65) Prior Publication Data

US 2018/0264869 A1     Sep. 20, 2018

Related U.S. Application Data

(63) Continuation of application No. 13/395,251, filed as application No. PCT/EP2010/005552 on Sep. 9, 2010, now Pat. No. 9,994,062.

(30) Foreign Application Priority Data

Sep. 11, 2009  (DE) .................. 10 2009 040 975.0

(51) Int. Cl.
*B42D 25/45*       (2014.01)
*B42D 25/351*      (2014.01)
(Continued)

(52) U.S. Cl.
CPC ............. *B42D 25/45* (2014.10); *B42D 25/21* (2014.10); *B42D 25/29* (2014.10); *B42D 25/324* (2014.10);
(Continued)

(58) Field of Classification Search
CPC ...... B42D 25/45; B42D 25/21; B42D 25/342; B42D 25/324; B42D 25/29; B42D 25/328;
(Continued)

(56) References Cited

U.S. PATENT DOCUMENTS 4,892,336 A    1/1990  Kaule et al.
5,712,731 A    1/1998  Drinkwater et al.
(Continued)

FOREIGN PATENT DOCUMENTS

AU    2007211654    8/2007
CN    101120139     2/2008
(Continued)

OTHER PUBLICATIONS

Rudolf L. van Renesse, "Optical Document Security", Third Edition (2005), pp. 177-222.
(Continued)

*Primary Examiner* — Justin V Lewis

(74) *Attorney, Agent, or Firm* — Hoffmann & Baron, LLP

(57) ABSTRACT

A multilayer body includes a transparent first layer. In the transparent first layer, a multiplicity of microlenses arranged in accordance with a microlens grid are impressed in a first region. Furthermore, the multilayer body includes a second layer, which is arranged below the first layer and in a fixed position with respect to the first layer and has a multiplicity of microimages arranged in accordance with a microimage grid and in each case in an at least regional overlap with one of the microlenses of the microlens grid for the purpose of generating a first optically variable information item. The grid pitches of the microimage grid and of the microlens grid in each case in at least one spatial direction are less than 300 μm.

35 Claims, 6 Drawing Sheets

(51) Int. Cl.
  *B42D 25/36* (2014.01)
  *B42D 25/21* (2014.01)
  *B42D 25/342* (2014.01)
  *B42D 25/324* (2014.01)
  *B42D 25/328* (2014.01)
  *B42D 25/29* (2014.01)
  *G02B 3/00* (2006.01)

(52) U.S. Cl.
  CPC ......... *B42D 25/328* (2014.10); *B42D 25/342* (2014.10); *B42D 25/351* (2014.10); *B42D 25/36* (2014.10); *G02B 3/005* (2013.01); *G02B 3/0056* (2013.01)

(58) Field of Classification Search
  CPC ............ B42D 2033/14; B42D 2033/10; B42D 2033/18; B42D 2035/44; B42D 2033/04; G02B 3/0056; G02B 3/005
  USPC ........................ 283/72, 94, 98, 109, 110, 901
  See application file for complete search history.

(56) References Cited

U.S. PATENT DOCUMENTS

| | | |
|---|---|---|
| 6,761,378 B2 | 7/2004 | Souparis |
| 7,808,710 B2 | 5/2010 | Hansen et al. |
| 8,149,511 B2 | 4/2012 | Kaule et al. |
| 2007/0246933 A1 | 10/2007 | Heim |
| 2008/0024846 A1 | 1/2008 | Tompkin et al. |
| 2008/0036196 A1 | 2/2008 | Steenblik et al. |
| 2008/0160226 A1 | 7/2008 | Kaule et al. |
| 2008/0182084 A1 | 7/2008 | Tompkin |
| 2009/0008923 A1* | 1/2009 | Kaule ................. B42D 25/342 283/67 |
| 2010/0109317 A1 | 5/2010 | Hoffmuller et al. |
| 2010/0194532 A1 | 8/2010 | Kaule |
| 2010/0290121 A1 | 11/2010 | Schilling et al. |

FOREIGN PATENT DOCUMENTS

| | | |
|---|---|---|
| CN | 101346244 | 1/2009 |
| DE | 102005028162 | 12/2006 |
| DE | 102005062132 | 7/2007 |
| DE | 102006029536 | 12/2007 |
| DE | 102007007914 | 8/2008 |
| DE | 102007029203 | 1/2009 |
| DE | 102007049512 A1 | 4/2009 |
| EP | 1238373 | 6/2004 |
| EP | 1878584 | 1/2008 |
| GB | 236249 | 6/1925 |
| JP | 2008052202 | 3/2008 |
| JP | 2008545550 | 12/2008 |
| JP | 2009532745 | 9/2009 |
| WO | WO9415418 | 7/1994 |
| WO | WO9427254 | 11/1994 |
| WO | WO2005106601 | 11/2005 |
| WO | WO2007115244 | 10/2007 |
| WO | WO2008031170 | 3/2008 |
| WO | WO2008098753 | 8/2008 |
| WO | 102007049512 A1 | 4/2009 |

OTHER PUBLICATIONS

Rudolf L. van Renesse, "Optical Document Security", Second Edition (1998), pp. 207-210.

* cited by examiner

MULTILAYER BODY

This application is a continuation application of U.S. application Ser. No. 13/395,251, filed Apr. 18, 2012, which claims priority based on an International Application filed under the Patent Cooperation Treaty, PCT/EP2010/005552, filed on Sep. 9, 2010 and German Application No. DE 102009040975, filed on Sep. 11, 2009.

BACKGROUND OF THE INVENTION

The invention relates to a multilayer body which can be used, in particular, as a security element for protecting security documents, in particular banknotes, as a security document, e.g. banknotes, valuable documents or ID documents, for product protection or for packaging applications.

It is known to use Moiré effects as security features for protecting security documents. Thus, by way of example, EP 1 238 373 B describes a method in which a characteristic Moiré intensity profile can be obtained by placing a main grid and a base grid one above another. The "hidden information" arising as a result of the main and base grids being placed one above another is in this case coded into the design of the individual grid elements of the base and main grids. By displacing the base and main grids relative to one another, an optically varying impression arises here for the human observer.

SUMMARY OF THE INVENTION

The invention is based on the object, then, of specifying an improved multilayer body which conveys an optically variable impression.

This object is achieved by a multilayer body comprising a transparent first layer, in which a multiplicity of microlenses arranged in accordance with a microlens grid are impressed in a first region, and comprising a second layer, which is arranged below the first layer and in a fixed position with respect to the first layer and has a multiplicity of microimages arranged in accordance with a microimage grid and in each case in an at least regional overlap with one of the microlenses and the microlens grid for the purpose of generating a first optically variable information item, wherein the grid pitches of the microimage grid and of the microlens grid in each case in at least one spatial direction are less than 300 µm. By virtue of an arrangement of this type, when the multilayer body is tilted, for the human observer upon viewing the multilayer body from the front side, i.e. on the part of that side of the first layer which faces away from the second layer, interesting, in particular two-dimensional or three-dimensional, optically variable effects with or without a depth effect arise.

Advantageous configurations of the invention are designated in the dependent claims.

In accordance with one preferred embodiment of the invention, the respective grid pitch of the microlens grid in a first spatial direction is greater by at least 50%, in particular by more than 100%, than the respective dimension of the respective microlens in the first spatial direction. In this case, grid pitch of the microlens grid is understood to be the respective microlens distance between the respective microlens and its adjacent microlens which is determined by the spacing-apart of the area centroids of the microlenses. Thus, the microlens grid spans a coordinate system having a first coordinate axis and a second coordinate axis, which is preferably at right angles with respect thereto. In the direction of the first coordinate axis and/or in the direction of the second coordinate axis, the microlenses of the microlens grid then succeed one another, wherein the area centroids of the microlenses preferably lie on a line oriented parallel to one of said coordinate axes and preferably parallel to the first spatial direction. The dimensions of the respective microlens in the first spatial direction is the distance between the base points of the respective microlens, which arise as a result of the intersection of a straight line, oriented in the direction of the first spatial direction and passing through the area centroid of the respective microlens, with the outer boundary line of the respective microlens.

It has been found that in the case of such a procedure, the layer thickness of the multilayer body that is necessary for generating the optical variable effect can be significantly reduced. Thus, the focal length of the microlens influences firstly the layer thickness of the first layer that is necessary for the impression of the microlenses, and also the spacing-apart of the second layer from that surface of the first layer which faces away from the second layer. If the focal length is increased, then although the layer thickness of the first layer that is necessary for impression decreases, the distance between the base points of the microlenses and the second layer, which preferably lies in the range of the focal length of the microlenses, correspondingly increases. By means of the measures described above, although the light intensity of the first optically variable information item is reduced somewhat, the layer thickness of the multilayer body can be significantly reduced despite the effects described above.

Furthermore, it has proved to be advantageous to use microlenses whose maximum structure height is at least 35%, in particular at least 50%, of the dimension of the respective microlens in the first spatial direction. Maximum structure height of the respective microlens is understood to be the maximum elevation of the microlens above the base point plane of the microlens that is spanned by the base points of the microlens.

In accordance with a further preferred exemplary embodiment of the invention, the respective dimension of the microimages in the first spatial direction is chosen such that it is more than 50%, in particular more than 100%, of the dimension of the respectively adjacent microlenses in the first spatial direction. It has surprisingly been found that, in the case of such a dimension of the microimages, the optically variable appearance can be further improved, in particular the angular range at which an optically variable effect becomes visible during tilting can be further improved.

Preferably, the microimages have a smallest dimension of less than 300 µm, preferably of less than 100 µm. Smallest dimension means that this smallest dimension is taken to be the compressed, smallest extent of the microimages, which, in the non-compressed extent, can be considerably greater than the smallest dimension. Smallest dimension of a zone, of an image or of a microimage is thus understood to be the dimension selected from length and width which is the smaller. In the case of more complex shapings, in order to determine the width and length, a corresponding virtual rectangular is determined, which is chosen such that the complex shaping is arranged within the rectangle and as many as possible of the boundary lines of the more complex shaping touch the edges of the rectangle.

In accordance with a further preferred exemplary embodiment of the invention, the microimages are not applied on a planar surface, but rather on a curved surface. This affords the advantage that the respective microimage is arranged over rather a large angular range approximately in the range of the focal length of the microlens and, consequently, the optical appearance of the multilayer body is improved, in particular the contrast sharpness at larger tilting angles is significantly improved.

In this case, the curvature is impressed into that layer of the multilayer body which is arranged above or below the microimage layer. As viewed from the direction of the microlens grid, the curvature has its deepest point in the central region of the respective microimage. The curvature preferably extends over the entire region of the microimage. However, it is also possible not to arrange the entire microimage in the region of the curvature. The deepest point of the curvature has, with respect to this highest point (edge region of the curvature) a height difference which is preferably in the range of between 5 and 25% of the width of the respective microimage.

Preferably, in order to produce the curvature in the region of the respective microimage, a surface structure is impressed into a layer arranged above or below the microimage layer, onto which the microimage layer is then applied. Said surface structure preferably has a shaping similar to the respective microlens, that is to say a shaping which, if appropriate, is mirrored relative to the shaping of the respective microlens 21 at the plane spanned by the longitudinal and transverse directions of the multilayer body and is distorted in said plane by a distortion factor f. Mirroring at the plane should be provided particularly when the surface structure is impressed into a layer arranged below the microimage layer, such that the condition mentioned above is met. If the microlens is therefore a spherical microlens, then the curvature has a sphere-surface-shaped shaping. If the microlenses are spherical cylindrical lenses, then the curvature has the shaping of a cylinder surface. In this case, the distortion factor f is preferably chosen so as to comply with the above-specified height differences between the edge and the deepest point of the curvature with respect to the size of the microimage.

In accordance with a further preferred exemplary embodiment of the invention, the multilayer body comprises a carrier substrate having a layer thickness of more than 6 µm, in particular more than 12 µm. The carrier substrate is then embodied in transparent fashion in a second region or has a window-shaped perforation in the second region, wherein the second region preferably covers the first region over the full area. The first layer is then arranged on the front side of the carrier substrate and the second layer is arranged on the rear side of the carrier substrate. This procedure affords a number of advantages: thus, firstly the security of the security element is further increased by virtue of the fact that the first layer and the second layer have to be applied to a common carrier substrate by means of two application steps to be performed with register accuracy with respect to one another. Register fluctuations in the application processes, in particular even slight rotations relative to one another of the elements applied to the front and rear sides of the carrier substrate by means of the application processes, become immediately visible as a result of the Moiré effects that occur, such that a copy of such a multilayer body and the removal of the film elements from a multilayer body and application to a further multilayer body by a counterfeiter—in particular on account of the achievable register accuracies for this of approximately 0.5 mm—are possible only with great difficulty and a counterfeit is directly recognizable. Furthermore, the layer thickness of the layers to be applied on the carrier substrate can be significantly reduced as a result, since the carrier substrate itself acts as an optical spacer layer between the first and second layers. As a result, the haptic properties of a valuable document, for example of a banknote, are influenced only insignificantly by the implementation of the layers generating the first optically variable information, and the resistance of the valuable document to the mechanical loads that occur during use is also further improved. Preferably—as already mentioned above—the multilayer body is in this case a valuable document and the carrier substrate constitutes the carrier substrate of the valuable document, for example the banknote substrate. The carrier substrate thus constitutes, for example, a banknote's carrier substrate which consists of paper, plastic, or a sequence, e.g. a laminate of paper and plastic layers, and which preferably has a layer thickness of 30 to 200 µm.

Preferably, in this case the multilayer body has in the first region a third layer, which is arranged below the second layer and which, when the multilayer body is viewed from the rear side, generates a second optically variable information item, which is not visible to the human observer when viewing the front side of the multilayer body and differs from the first optically variable information item. In this case, a layer which is opaque to the human observer at least in reflected-light viewing is preferably also arranged between the second and third layers, and enables reliable optical separation of the first and second optically variable information items. This measure further improves security in respect of copies and provides succinct security features that are easily recognizable for the observer.

Further advantages arise from the fact that in the first layer and/or in the second layer in a region adjoining the first region, preferably enclosing the first region, even further security elements, preferably embodied in opaque fashion, are formed, which interact in transmitted-light viewing and, for example in transmitted-light viewing, complement one another to form an optically variable information item. Furthermore, it is advantageous for printing layers applied to the front or rear side of the carrier substrate likewise to contain such security elements, which, together with such security elements provided in the first, second or third layer, complement one another in transmitted-light viewing to form an information item that can be recognized in transmitted-light viewing. This further increases the security against counterfeiting.

In accordance with a further preferred exemplary embodiment of the invention, the multilayer body has a translucent layer arranged between the first layer and the second layer. Further interesting optically variable effects can be obtained by virtue of this measure. Thus, it is thereby possible for the first optically variable effect to be visible as a watermark only upon transmitted-light viewing. In reflected light, however, the first optically variable effect is not visible. In this embodiment, the microimages are preferably formed in each case by one or a plurality of image regions arranged in front of a background region, wherein the one or the plurality of image regions is or are embodied in opaque fashion and the background region is embodied in transparent fashion, or vice versa. In this case, the opaque image regions or opaque background regions can be formed, for example, from opaque lacquer layers, opaque metal layers. The opaque regions and/or the transparent regions can comprise UV-active, IR-active materials or magnetic materials, which can then have optical and/or machine-readable additional functions. Furthermore, in this embodiment, the multilayer body preferably comprises a carrier substrate which is embodied in transparent fashion in the first region or has a window-shaped perforation in the first region. The multilayer body thus preferably consists, in the background regions, of the translucent layer, of at least one opaque layer and optionally of one or a plurality of transparent layers and, in the image regions, of the translucent layer and one or a plurality of transparent layers, or vice versa.

The translucent layer preferably has scattering properties. Preferably, the translucent layer has a transmissivity of between 1% and 50%, more preferably of between 5% and 30%, averaged over the wavelength range visible to the human observer. Furthermore, the translucent layer preferably has the following volume scattering properties: scattering of a proportion of between 5% and 50% of the incident light at scattering angles of >5° on average over the wavelength range visible to the human observer.

In accordance with a further preferred exemplary embodiment of the invention, the second layer has in the first region at least one first zone, in which the microimages are provided, and has at least one second zone, in which optically active surface structures for generating a third optically variable information item are provided, said third optically variable information item differing from the first optically variable information item. In this case, the optically active surface structures are preferably diffractive surface structures which generate for example in the second zones a hologram or a Kinegram® (Kinegram®=optically variable effect with color change effects and/or image change effects in the case of a changing viewing angle and/or changing illumination conditions) as third optically variable information item. In this case, it is possible for the microlenses then to be provided only in the first zones, but not in the second zones. Furthermore, it is also possible for the microlenses to be provided both in the first and in the second zones and thus for the microlens grid to cover both the first and the second zones. In this case, it is particularly advantageous when the first layer, in the at least one second zone, is provided with a lacquer layer, in particular is overprinted with a lacquer layer, the refractive index of which differs from the refractive index of the first layer by less than 0.3. This additional lacquer layer extinguishes the optical effect of the microlenses in the at least one second zone, such that the microlenses can no longer influence the optical appearance of the optically active surface structure arranged in the at least one second zone. This procedure further improves the security of the multilayer body against counterfeiting and copying. Errors in the register-accurate arrangement of the first and second layers with respect to one another lead directly to the disturbance of the first and third optically variable information items or a boundary region between first and third optically variable information items becomes visible, which exhibits distinct disturbing effects that are immediately discernible to the human observer. Therefore, even tiny register deviations between first and second layers become discernible to the human observer.

Preferably, the at least one second zone has a smallest dimension of more than 300 μm and is shaped in patterned fashion for generating a fourth information item. Thus, the at least one second zone is shaped for example in the form of a letter, a number, a symbol or a pictorial representation which represents the fourth information item.

Furthermore, it is advantageous if the first region is subdivided into a multiplicity of first and second zones, and the first and second zones are arranged in accordance with a regular grid having a grid pitch of less than 300 μm in at least one spatial direction. As a result, it is possible to make the first and third optically variable information items visible to the human observer in one and the same surface region of the multilayer body and thus to obtain distinctly recognizable, abrupt changes in the optical appearance in this region. Furthermore, in an embodiment of this type, both the first and the third optically variable information items are disturbed very distinctly even in the case of small register fluctuations, such that even tiny register fluctuations become directly discernible even to the unpracticed observer and a counterfeit or copy of the multilayer body is thus made significantly more difficult.

In accordance with one preferred exemplary embodiment of the invention, the microimages are formed in each case by one or a plurality of image regions arranged in front of a background region or surrounded. The microimages consist for example in each case of a motif, for example in the form of a letter, a number, a text, a symbol or an image, which forms the one or the plurality of image regions and which is visible in front of a background region, i.e. is visible as a result of the contrast against the background region. In this case, the motif can be surrounded by a background region adjoining the boundary line of the motif or else comprise partial motifs or cutouts which are separated by the background region or filled by the latter. In this case, it is also possible for the color, the reflection properties and/or the absorption properties of the second layer to be varied within the image region.

As already mentioned above, it is possible for the one or the plurality of image regions of the microimages to be opaque and the background region or the background regions to be transparent, or vice versa. Furthermore, it is also possible for the one or the plurality of image regions and the background region to have different transmission or reflection properties. It is furthermore advantageous if the image regions and the background region have different polarization properties, e.g. different linear polarization or different circular polarization or else different elliptical polarization states.

The second layer can consist of an individual layer or of a plurality of partial layers, in particular has a metallic layer, a colored lacquer layer and/or a photoresist layer which is provided in the first region in the image regions and is not provided in the background region, or vice versa. In this case, the photoresist layer preferably consists of a positive or negative photoresist, which more preferably can also be colored with a dye or pigment.

Furthermore, it is advantageous if the image regions and/or the background regions are covered with an optically variable element, in particular the image regions, on the one hand, and the background regions, on the other hand, are covered with different optically variable elements. The optically variable elements could be formed, for example, by optically active surface reliefs, in particular by diffraction structures, for example diffraction structures such as holograms or a Kinegram®, anisotropic or isotropic matt structures, moth-eye structures, asymmetrical or symmetrical grating structures, linear grating structures, cross grating structures, hexagonal grating structures, zeroth-order diffraction structures or combinations of such diffraction structures. In particular, it can be advantageous to use diffraction structures which are covered with a preferably metallic reflection layer and absorb a large portion of the incident light, in particular linear grating structures, cross grating structures, or hexagonal grating structures having grating periods in the range of 100 nm to 500 nm, particularly preferably in the range of 200 nm to 400 nm, and structure depths in the range of 50 nm to 2000 nm, particularly preferably in the range of 200 nm to 1000 nm. It is furthermore advantageous if the optically variable elements are formed by thin-film layer elements which have an optical layer thickness of $\lambda/2$ or $\lambda/4$, for $\lambda$ in the wavelength range of visible light, and exhibit viewing angle-dependent color shift effects, or is formed by a liquid crystal layer which exhibits different polarization properties in different regions or likewise exhibits a viewing angle-dependent color shift effect. It is furthermore advantageous if the optically variable elements comprise UV-active, IR-active materials, in particular pigments or dyes or magnetic materials, in particular particles or laminae. Advantageously, the second layer thus also has a replication lacquer layer having a surface relief impressed into the surface of the replication lacquer layer, wherein—as explained above—the surface relief impressed in the image regions, on the one hand, and in the background regions, on the other hand, is different.

In accordance with one preferred exemplary embodiment of the invention, the microlens grid is arranged in a manner rotated at an angle of 45° with respect to the longitudinal axis of the multilayer body. It has been found that particularly interesting optical effects can thereby be generated particularly when a one-dimensional microlens grid is used. If, by way of example, a one-dimensional microlens grid in which the focal point lines—preferably oriented parallel to one another—of the microlenses are arranged at an angle of 45° with respect to the longitudinal axis of the multilayer body is thus used, then a predetermined movement effect that can proceed at any angle from 0 to 360°, that is to say in any desired direction, is manifested upon the tilting of the multilayer body both about an approximately horizontal axis and about an approximately vertical axis. Furthermore, a movement along a nonlinear path, for example along a bent curve, can also be effected. Longitudinal axis of the multilayer body is understood in this case to be the coordinate axis oriented in the direction of the length of the multilayer body.

Furthermore, it is preferred here for the multilayer body to have a rectangular, in particular strip- or tape-shaped shaping.

In this case, it is possible for the first region, in which the microlenses are provided, to cover the entire multilayer body or to cover a region over the entire length of the multilayer body or else to cover only a partial region of the multilayer body. Thus, it is possible, for example, that alongside the first region even further regions, not covered by the microlenses, are provided on the multilayer body, with other, preferably optically variable security elements being provided in said regions. However, these other, preferably optically variable security elements can also be provided wholly or only regionally in the first region and in this case covered completely or only regionally by the microlenses. Despite the covering with the microlenses, other security elements can be perceptible and/or readable sufficiently for their effect or functionality, preferably optically and/or in machine-readable fashion.

In accordance with one preferred exemplary embodiment of the invention, the microlens grid and/or the microimage grid are/is a two-dimensional microlens grid and/or microimage grid. In this case, the microlens grid and/or microimage grid span(s) a coordinate system having two coordinate axes preferably at right angles to one another, wherein the microlenses and/or microimages succeed one another both in a first spatial direction, in particular in the direction of one coordinate axis, and in a second spatial direction, in particular in the direction of the other coordinate axis, with a respective grid pitch of between 5 μm and 150 μm. In this case, the spacing-apart of adjacent microimages and/or microlenses is preferably determined by the spacing-apart of the area centroids of the microlenses and/or microimages and preferably corresponds to the respective grid pitch.

However, it is furthermore also possible for the microlens grid and/or the microimage grid to be a one-dimensional microlens grid and/or microimage grid, in which two or more microlenses and/or microimages succeed one another in one spatial direction with a respective grid pitch of between 5 μm and 300 μm.

In this case, the microimage grid and/or the microlens grid can be a regular grid having constant grid pitches, but also an irregular grid having varying grid pitches. Furthermore, it is also possible for the coordinate systems spanned by the microlens grid and/or the microimage grid to be geometrically transformed and thus for the coordinate axes not to have the form of a straight line, but rather to be formed for example in the shape of a wavy line or in circular fashion.

Preferably, the grid pitches of the microimage grid and microlens grid differ from one another in each case for adjacent microimages and microlenses by less than 10%, in particular differ from one another by between 0.5 and 5%. In a configuration of this type, when identical microimages are used, a Moiré magnification effect is brought about, that is to say that the first optically variable information item visible at a specific viewing angle corresponds to a magnified representation of the (identical) microimages. However, even upon the use of different microimages, which leads to the generation of more complex movement and transformation effects during the tilting of the multilayer body, this measure has proved to be advantageous.

It has furthermore proved to be worthwhile for the microimage grid and the microlens grid to be arranged in a manner rotated by between 0.05° and 5° relative to one another, that is to say for the axes of the mutually assigned coordinate axes of the coordinate system spanned by the microimage grid and the microlens grid to form such an angle.

In accordance with one preferred exemplary embodiment of the invention, in the first region, the grid pitch of the microlens grid, the grid pitch of the microimage grid and/or the rotation of the microimage grid and of the microlens grid relative to one another are/is varied continuously in accordance with a parameter variation function in at least one spatial direction. As a result, the magnification, reduction and transformation effects already mentioned above can be obtained during tilting.

Furthermore, it is advantageous if the microimage grid has in the first region at least two microimages which differ from one another. It is particularly advantageous in this case if, in the first region, the form and/or the color of the microimages change(s) continuously in accordance with a transformation function and, by way of example, movement effects combined with magnification, reduction and transformation effects are thus brought about during the tilting of the multilayer body.

In accordance with a further preferred embodiment, in a first partial region of the first region, the grid pitch of the microlens grid, the grid pitch of the microimage grid and/or the rotation of the microlens grid relative to the microimage grid are/is chosen such that these parameters differ relative to the corresponding parameters in a second partial region of the first region. This has the effect that the optically variable appearance in the first and second partial regions differs from one another and the security against counterfeiting is thus improved further.

BRIEF DESCRIPTION OF THE DRAWINGS

The invention is explained by way of example below on the basis of a number of exemplary embodiments with the aid of the accompanying drawings.

FIG. 1*b* shows a schematic plan view of a multilayer body.

FIG. 1*c* shows a schematic plan view of a multilayer body.

DETAILED DESCRIPTION OF THE INVENTION

Figure 1A:
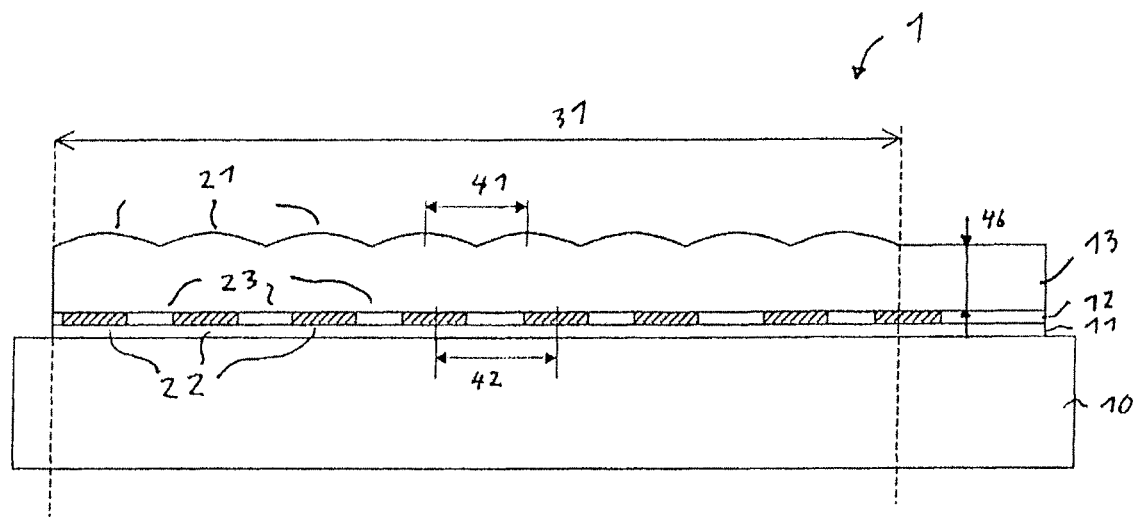
FIG. 1*a* shows a schematic sectional illustration of a multilayer body.

FIG. 1*a* shows a multilayer body 1 comprising a carrier substrate 10 and a film element applied on the carrier substrate, comprising an adhesive layer 11, a decorative layer 12 and a transparent layer 13.

The carrier substrate 10 is preferably a paper substrate having a layer thickness of between 10 µm and 200 µm. If the multilayer body 1 is a packaging, then the carrier substrate can also be a (thick) cardboard or plastic substrate. However, it is also possible for the carrier substrate 10 to be a substrate comprising one or a plurality of layers. The carrier substrate 10 preferably forms the carrier substrate of a valuable document, preferably of a banknote, and is thus, for example, optionally also printed with one or a plurality of layers on the front side and/or on the rear side.

The film element comprising the layers 11, 12 and 13 is applied in the form of a patch or strip onto the carrier substrate 10. Said film element is thus, for example, a security thread or security strip, in particular a window security thread or window security strip. However, it is also possible for the film element to cover the entire region of the carrier substrate 10 over the whole area. The film element comprising the layers 11, 12 and 13 is preferably applied as a transfer layer of a transfer film, in particular of a hot embossing film, onto the substrate 10. However, it is also possible for the film element to be embodied as a laminating film or as a security thread and to be applied as such onto the carrier substrate 10 or to be introduced into the carrier substrate 10.

The layer 11 is an adhesive layer having a layer thickness of between 0.5 and 10 µm, preferably between 1 and 5 µm.

The decorative layer 12 is a layer having a multiplicity of microimages 22 arranged in accordance with a microimage grid. The decorative layer 12 thus consists, for example, of a structured, partially provided metal layer, in particular a metal layer having a layer thickness of 10 nm to 5000 nm, which is shaped regionally in patterned fashion in order to form the microimages 22. In this case, the microimages 22 in each case show a motif formed by the contrast between one or a plurality of image regions and one or a plurality of background regions 23 which exhibit a different optical appearance. Thus, in the configuration of the decorative layer 12, as explained above, as a partial metal layer, by way of example, the metal of the metal layer is provided in the image regions and not provided in the background regions 23, such that the microimages 22 are manifested by the contrast between image regions and background regions 23. If the background regions are embodied in transparent or translucent fashion, for example by means of a transparent or translucent lacquer, the adhesive layer 11 is visible through the background regions 23, said adhesive layer thereby serving as a contrasting background plane with respect to the image regions. In this case, it has proved to be advantageous to color the adhesive layer 11 with colored pigments and/or dyes in order thus also to be able to make the background regions 23 colored. Highly contrasting motifs composed of, for example, metallic image regions and colored background regions can thus be obtained. It is likewise possible to color the adhesive layer 11 alternatively or additionally with UV-active or IR-active pigments and/or dyes in order to be able to vary the contrast effect between image regions and background regions 23 depending on the illumination condition.

Furthermore, it is also possible for the microimages 22 to be formed not only by the decorative layer 12 but by a decorative layer printed directly on the carrier substrate 10 and/or by the superimposition of the decorative layer 12 with such a layer applied directly to the carrier substrate 10. It is thus possible, for example, to print on features which have a small phase variation with respect to the grid of the microlens grid. Furthermore, by way of example, an offset printing can have a grid of background colors and image colors which has a frequency spread, whereas the lens grid has a constant frequency.

Instead of an offset printing, it is also possible here to use a different printing method, for example a gravure printing method, a screen printing method, a pad printing method, an intaglio printing method or else an inkjet printing method.

Furthermore, it is also possible for the layer 12 to be formed by a colored lacquer layer or a colored photoresist layer or to consist of a plurality of (colored) lacquer layers, photoresist layers and/or metal layers which bring about a different optical appearance of the decorative layer 12 in the image regions and background regions and thus form the microimages 22 in the decorative layer 12. Furthermore, it is possible for the decorative layer to have a replication lacquer layer, in which an optically active surface relief is impressed. In this case, the optical contrast between image regions and background regions can be brought about by virtue of the fact that the surface reliefs are impressed either in the image regions or in the background regions or, in the image regions and in the background regions, different surface reliefs are impressed into the replication lacquer layer. The replication lacquer layers and, in particular, the surfaces of the replication lacquer layers into the which the respective surface relief is impressed are provided with a reflection-increasing layer, for example an HRI layer or a metallic layer, preferably composed of aluminum, silver, copper, gold, chromium or an alloy comprising such metals. In this case, the decorative layer 12 thus has a replication lacquer layer having an impressed surface relief and a reflection layer, which is preferably arranged below the replication lacquer layer. In this case, the optically active surface relief used is preferably a diffractive relief structure having a spatial frequency of more than 300 lines/mm, preferably of 500 to 4500 lines/mm. The diffractive relief structure is preferably a computer-generated diffraction grating, for example a dot matrix or e-beam hologram, wherein said diffraction grating differs for example in terms of azimuth angle, spatial frequency, profile form or relief depth in the image regions and background regions. Furthermore, it is also possible for the surface relief used to be an anisotropic or isotropic matt structure, moth-eye structures, asymmetrical or symmetrical grating structures, linear grating structures, cross grating structures, hexagonal grating structures, zeroth-order diffraction structures or combinations of such diffraction structures.

Furthermore, it is also possible for the decorative layer 12 to comprise, in addition to or instead of the abovementioned layer, a thin-film layer system for producing viewing angle-dependent color shift effects, a liquid crystal layer or a layer comprising optically active pigments, for example UV pigments, liquid crystal pigments or interference layer pigments. This layer, too, is preferably structured such that it is provided either in the background regions or in the image regions and thus brings about a contrast between image regions and background regions. Furthermore, it is also possible for the microimages to have a color profile or different brightness values in the region of an image region and the corresponding layers of the decorative layer correspond are configured in order to correspondingly realize this brightness or color profile.

The microimages 22 are arranged—as already mentioned above—in accordance with a one- or two-dimensional microimage grid, wherein the grid pitch of the microimage grid, that is to say the respective spacing-apart of adjacent microimages 22, can be constant or else can vary. FIG. 1a depicts by way of example a grid pitch 42 of the microimage grid which is determined by the microimage distance between the adjacent microimages 22 shown in FIG. 1a, that is to say the spacing-apart of the area centroids thereof with respect to one another.

The layer 13 consists of a material transparent to the human observer and preferably has a layer thickness of between 5 and 150 μm. Microlenses 21 are impressed into that surface of the layer 13 which faces away from the layer 12, as is indicated in FIG. 1a. The microlenses can be spherical microlenses, but also any other lens forms, in particular also cylindrical lenses. In this case, the cylindrical lenses can be embodied spherically, aspherically or as diffractive lenses having any desired phase functions. In the simplest case, the focal length of the lenses is determined here by their radius of curvature. The focal length of the microlenses is preferably chosen here such that the spacing-apart 46 of the microimages 22 from the microlenses 21 is approximately in the range of the focal length of the microlenses 21.

The relief depth, that is to say the distance between the highest and the deepest points of the microlenses, is in this case preferably between 2 and 50 μm. The microlenses 21 can be introduced into the surface of the layer 13 for example by means of an embossing tool, for example by means of a mechanically acting embossing roller or an embossing stamp or by means of laser ablation. In this case, the transparent layer 13 consists for example of a lacquer layer, of a plastic film, for example a film composed of PET (polyethylene terephthalate), PEN (polyethylene naphthalate), or BOPP (biaxially oriented polypropylene) or of a plurality of layer plies, for example a replication lacquer layer and a transparent carrier film, for example a PET film, arranged below the latter. The impression of the microlenses into the transparent layer 13 is in this case preferably effected by means of UV replication, that is to say by impressing the microlens structure into a soft, not yet or only slightly cured replication lacquer layer and subsequently curing the replication lacquer layer using high-energy radiation, preferably UV radiation. However, it is also possible that, in order to produce the microlenses 21, a lacquer is applied to a transparent layer and is correspondingly provided with a surface corresponding to the microlens grid for example by means of a shaping tool or a physical process. Furthermore, it is also possible for the microlenses 21 to be diffractive lenses.

Furthermore, it is also possible for even further transparent layers to be provided in the multilayer body 1 between the layers 12 and 13, or else for even further layers to be provided between the layer 11 and the layer 12 or above the layer 13 in the multilayer body 1.

The microlenses 21 are arranged—as already explained above—in accordance with a one- or two-dimensional lens grid, wherein the grid pitch of the lens grid can be constant or else can vary locally. Thus, FIG. 1a shows by way of example a grid pitch 41 corresponding to the microlens distance between the adjacent microlenses shown in FIG. 1a, that is to say the spacing-apart of the area centroid thereof.

The spacing-apart 46 of the microlenses 21 from the microimages 22 is preferably approximately in the range of the focal length of the microlenses 21 and preferably deviates by not more than 10% from the focal length of the microlenses 21.

The grid pitch of the microlens grid along the sectional line of the section shown in FIG. 1a in this case is preferably between 5 and 300 μm and the grid pitch of the microimage grid in the direction of the sectional line is preferably between 5 and 300 μm. With regard to the shaping of the microimages 22, the configuration of the grid pitch of the microimage grid and microlens grid and the mutual orientation of the microlens grid and microimage grid, reference is made to the previous explanations.

Preferably, the microlenses 21 are arranged in accordance with a one-dimensional lens grid, as will be explained below by way of example with reference to the figures in FIG. 1b to 1e.

Thus, FIG. 1b shows a plan view of an excerpt from the layer 13, wherein the focal point lines of the microlenses 21 shaped in the form of cylindrical lenses is indicated by lines in FIG. 1b. The microlenses 21 are arranged in accordance with a one-dimensional microlens grid which spans a coordinate system having the axes 50 and 51. The axis 50 of the coordinate system is oriented parallel to the transverse axis of the multilayer body 1 and parallel to the focal point lines of the microlenses 21 and the coordinate axis 51 is oriented perpendicular to the coordinate axis 50. In this case, the microlenses 21 preferably have a length of more than 1 mm and the distance between adjacent microlenses 21, the grid pitch 41, is less than 300 μm, preferably between 10 and 200 μm. In the embodiment in accordance with FIG. 1b, the area centroid lines of the microimages 22 are preferably oriented substantially parallel or parallel to the coordinate axis 50 and the grid pitches of the microimage grid and of the microlens grid differ from one another, in particular by between 0.5 and 5%.

A further preferred exemplary embodiment will now be explained with reference to the figures in FIG. 1c and FIG. 1d.

FIG. 1c shows a plan view of the layer 13, wherein—as in FIG. 1b—the focal point lines of the microlenses 21 are identified by corresponding lines. Here, too, the microlenses 21 are formed by cylindrical lenses arranged in accordance with a one-dimensional microlens grid having a grid pitch 41 of between 10 μm and 300 μm, here 35 μm. The focal length of the microlenses is between 10 μm and 500 μm. As shown in FIG. 1d, the focal point lines of the microlenses 21 are in this case rotated at an angle of 45° relative to the longitudinal axis of the multilayer body 1 and are arranged substantially parallel to one another. In this case, the coordinate axis 51 illustrates the longitudinal direction of the multilayer body 1 and the coordinate axis 50 the transverse direction of the multilayer body 1, which is preferably a strip-shaped or thread-shaped security element. As explained in FIG. 1b, the microimages 22 are arranged in accordance with a microimage grid, which—as described above—is arranged in a manner rotated relative to the microlens grid (in particular is rotated by 45°) or, as described above, differs therefrom in terms of the grid pitch. This results in the optical appearance 60 illustrated in FIG. 1d, in the case of which optical appearance foreground elements 61 describe a left-right movement upon the tilting of the multilayer body 1 into the horizontal axis and a left-right movement upon the tilting of the multilayer body 1 about the vertical axis.

Figure 1E:
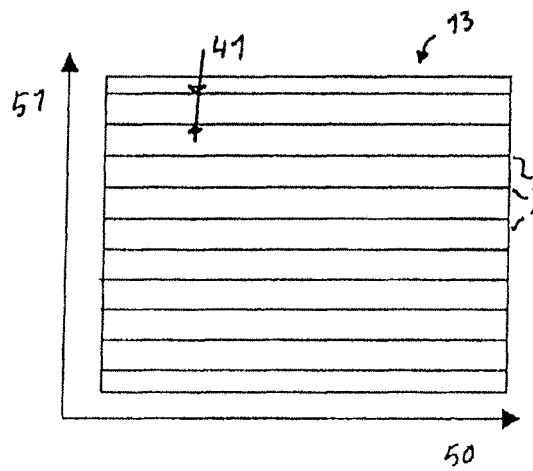
FIG. 1*e* shows a schematic plan view of a multilayer body.
Figure 1E:
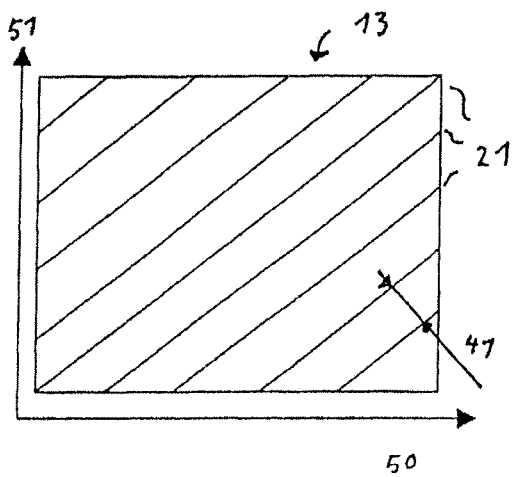
Figure 1E:
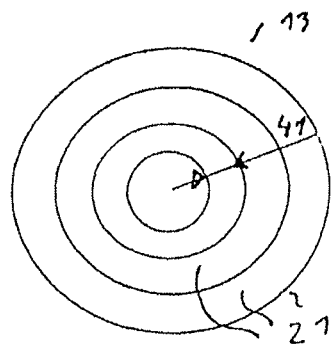
Figure 1F:
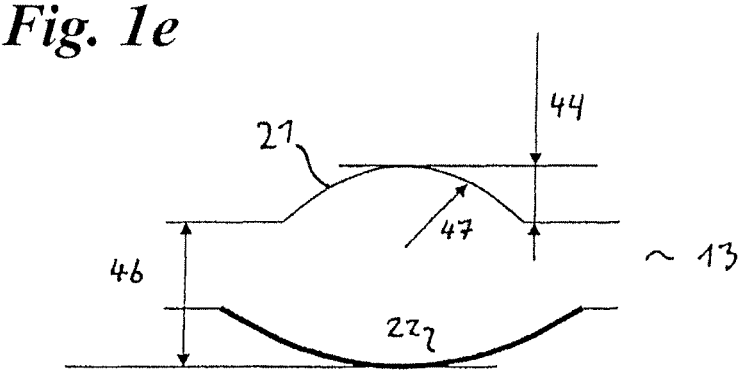
FIG. 1*f* shows a schematic sectional illustration of an excerpt from a multilayer body.
Figure 1D:
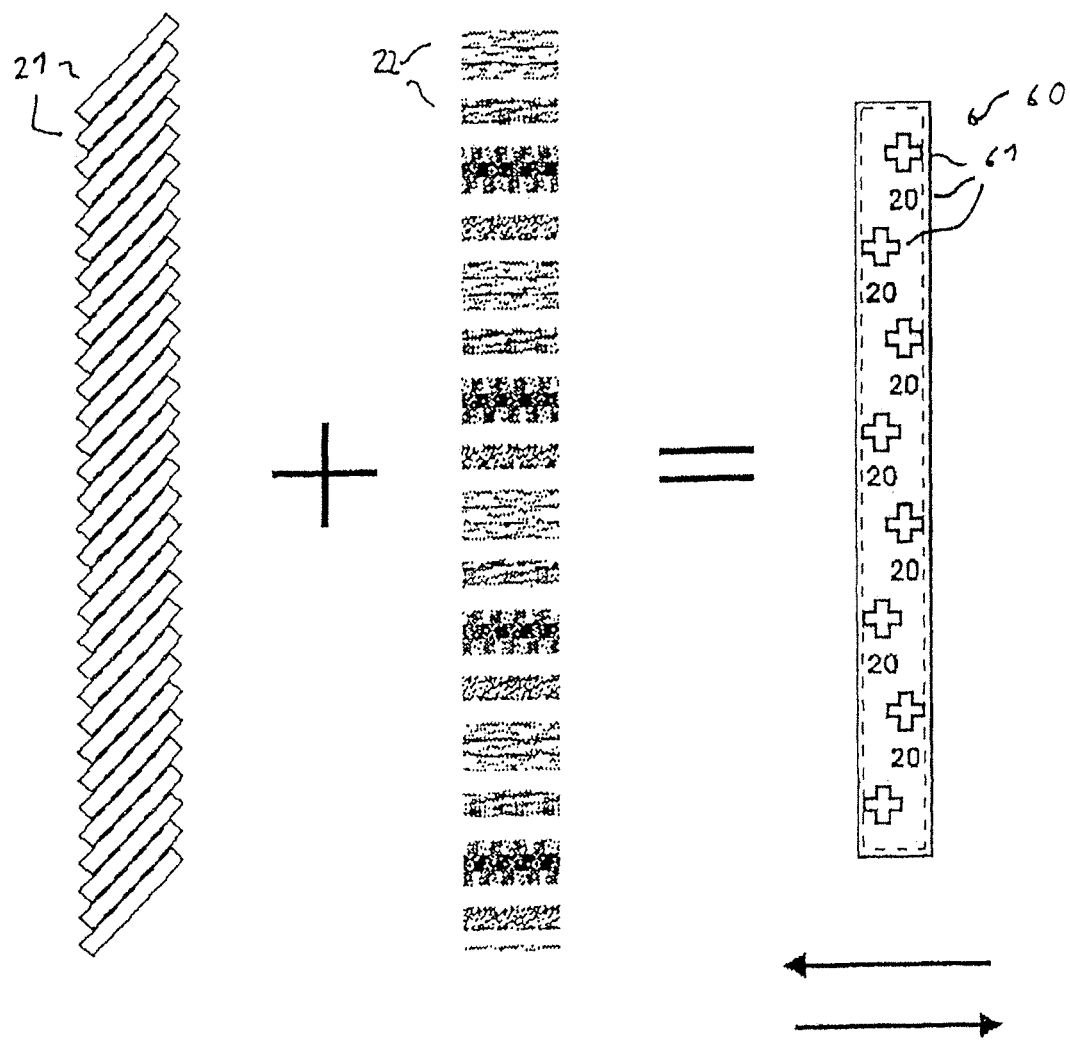
FIG. 1*d* shows an illustration for elucidating the functional principle of the multilayer body according to FIG. 1*c*.

In the exemplary embodiment according to FIG. 1d, the multilayer body 1 has, by way of example, a length of 100 mm and a width of 10 mm, that is to say a longitudinal dimension of 100 mm and transverse dimension of 10 mm.

A further embodiment is illustrated by FIG. 1e. FIG. 1e likewise shows a plan view of the layer 13, wherein the focal point lines of the microlenses 21 are likewise indicated here by lines. In this case, the microlenses 21 are formed by cylindrical lenses which are arranged concentrically with respect to one another and which each have a circular shaping and are arranged in a manner spaced apart from one another in a grid pitch 41—as indicated in FIG. 1e. Furthermore, it is also possible for the microlenses 21 to be arranged in accordance with a geometrically transformed one-dimensional microlens grid and thus, by way of example, for the focal point lines of the microlenses in the plane spanned by the coordinate axes 50 and 51 in each case to have a wavy-line shaping.

A further exemplary embodiment is illustrated with reference to FIG. 1f. FIG. 1f shows an excerpt from the multilayer body 1 with a microlens 21 and an assigned microimage 22. The microlens 21 is a cylindrical lens having a radius 47 and a maximum structure height 44. In the exemplary embodiment according to FIG. 1f, the microimages 22—in contrast to what is shown in FIG. 1a—are not arranged in a planar plane, but rather are arranged on a surface of the layer 13 which is curved in the region of the respective microimage 22. For this purpose, a surface structure is replicated into the layer 13 both into the top side and into the underside, wherein the surface structures provided in the region of the microimages 22 preferably has a lens-type shaping—as has been illustrated in figure if. As already explained above, the microstructure impressed into the layer 13 in the region of the microimages 22 has a similar shaping to the microlens 21 and thus forms a curvature in the form of a cutout of a cylindrical surface, as is illustrated in FIG. 1f.

In the case present here, in which the microlens 21 is embodied as a spherical cylindrical lens having a radius 47, the following approximately holds true:

$$\frac{1}{x_i} = \frac{1}{3r} + \frac{0.074}{r}$$

In this case, r is the radius of the microlens 21 and $x_i$ is the position of the image with respect to the normal to the surface of the layer 13, that is to say corresponds to the dimension 46. For a radius r=50 μm, this results in a parallax focus of 150 μm and a value of 122.75 μm for the outermost image edge, that is to say a deviation of 18%. The curvature for the microimage 22 is accordingly to be chosen such that the deepest location of the microimage 22 is at a distance of 150 μm from the top side facing away from the microimage, that is to say that the dimension 46 is 150 μm, and that in the edge region of the image the microimage is arranged at a distance of 122.75 μm from the top side layer 13.

Figure 2:
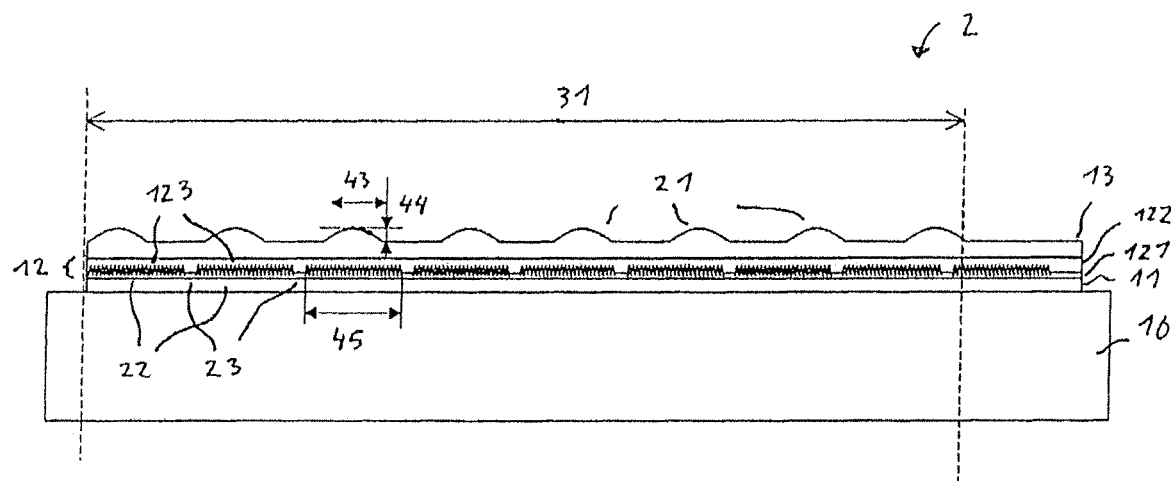
FIG. 2 shows a schematic sectional illustration of the multilayer body.

FIG. 2 shows a multilayer body 2, which is improved and modified relative to the multilayer body 1 in the manner described below:

The multilayer body 2 comprises the carrier substrate 10 and the film element comprising the layers 11, 12 and 13. The layer 13 is embodied like the layer 13 according to FIG. 1a to figure if with the difference that the microlenses 21 in the region 31, unlike in the case of the embodiment according to FIG. 1, do not directly succeed one another, rather that "flat" regions are provided between the microlenses 21, which regions are not part of a microlens and do not contribute anything to the deflection function of the microlenses 21. As illustrated in FIG. 2, the lenses have, in the direction of the sectional line of the section illustrated in FIG. 2, a dimension 43 which is smaller than the respective grid pitch of the microlens grid along the sectional line by at least 30%, in particular by more than 50%, that is to say that the dimension 43 is ≤0.5 grid pitch 41. Furthermore, the microlenses 21 have a maximum structure height, that is to say dimension 44, which is at least 25%, in particular at least 50%, of the dimension 43 of the microlenses. This configuration of the microlenses makes it possible to correspondingly reduce the layer thickness of the layer 13 and—as illustrated in FIG. 2—to make the layer thickness of the multilayer body 2 significantly smaller than the layer thickness of the multilayer body 1. As already mentioned above with regard to FIG. 1a, the distance between the base point plane of the microlenses 21 and the decorative layer 12 is in this case chosen approximately (deviation ±10%) such that it corresponds to the focal length of the microlenses 21. Since the microlenses 21, on the other hand, cover a significantly smaller proportion of the area of the region 31, the maximum structure height of the microlenses 21 also correspondingly decreases upon the reduction of the focal length of the microlenses 21, such that a particularly thin configuration of the multilayer body 2 can be obtained by means of these two effects.

The decorative layer 12 is embodied like the decorative layer 12 according to FIG. 1a, wherein FIG. 2 shows an embodiment of the multilayer body 2 in which the decorative layer consists of a transparent replication lacquer layer 122 and a whole-area metal layer 121, wherein, in the regions forming the image regions of the microimages 22, a diffractive relief structure 123 is impressed into the surface of the replication lacquer layer 122 and such a relief structure is not impressed into the background regions 23, that is to say that these regions are embodied as mirror regions. It is also worth mentioning here, moreover, that in the embodiment according to FIG. 2 the dimension 45 of the microimages 21 in a first spatial direction, here in the direction of the sectional line of the section shown in FIG. 2, is more than 50%, in particular more than 100%, of the dimension 43 of respectively adjacent microlenses 21 in the first spatial direction. The advantages already set out above are obtained as a result.

In the case of the exemplary embodiment shown in FIG. 2, the dimension 43 is preferably between 5 μm and 100 μm, the maximum structure height 44 of the microlenses 21 is between 3 μm and 50 μm, and the dimension 45 of the microimages 22 is preferably between 3 μm and 50 μm. With regard to the other configurations of the multilayer body 2, reference is made to the explanations concerning the multilayer body 1 according to FIG. 1a to FIG. 1f.

Figure 3:
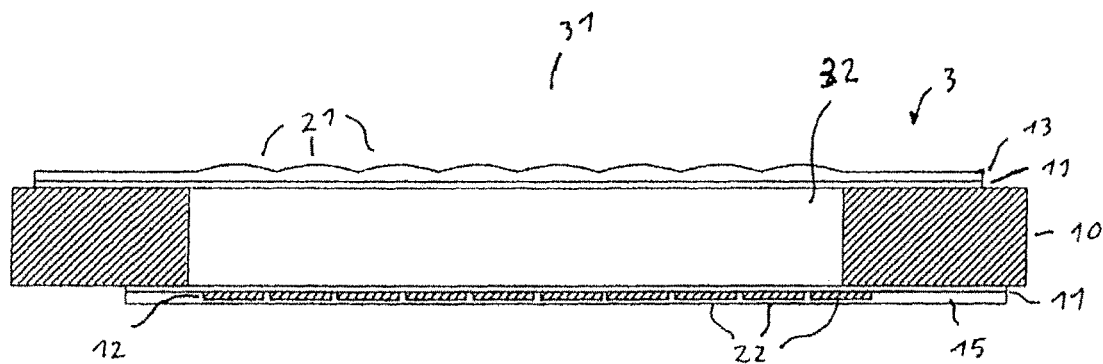
FIG. 3 shows a schematic sectional illustration of a multilayer body.

FIG. 3 shows a multilayer body 3 constituting a banknote. The multilayer body 3 has in the region 31 the carrier layer 10, the adhesive layer 11, the decorative layer 12 with the microimages 22 and the transparent layer 13 with the microlenses 21. In this case, the transparent layer 13 can be linked integrally with the carrier layer 10, that is to say that the microlenses 21 can also be introduced, preferably embossed, directly as surface relief into the carrier layer 10 without the use of a separate layer 13. If a separate layer 13 is applied to the carrier layer 10, this can advantageously be a radiation-curing lacquer, into which the microlenses 21 are embossed by means of an embossing roller and the lacquer is subsequently cured e.g. using UV radiation. With regard to the configuration of these layers, reference is made to the above explanations according to FIG. 1a to FIG. 2.

The carrier substrate 10 is the carrier substrate of the banknote. In a region 32, the carrier substrate 10 is embodied in transparent fashion. If the carrier substrate 10 consists, for example, of a plastic film or of a multilayered laminate of a plurality of plastic layers, then these plastic layers are embodied such that they are transparent to the human observer in the region 32. If a paper substrate is involved, then the carrier substrate 10 preferably has in the region 32 a window-shaped perforation, which is then covered on both sides by the layers shown in FIG. 3. Outside the region 32, the carrier substrate 10 is preferably embodied in opaque fashion, that is to say printed with corresponding opaque layers or provided with a correspondingly colored layer. Onto the carrier substrate 10, a film element comprising the layers 11 and 13 is then applied onto the front side and a film element comprising the layers 11, 12 and a layer 15 is applied onto the rear side. The layer 15 is an optional protective lacquer layer. The application of these film elements onto the carrier substrate 10 can be carried out by means of one of the methods described above, for example by means of transferring the transfer layer of a transfer film or laminating a laminating film onto the carrier substrate 10.

As illustrated in FIG. 3, the film elements applied on the carrier substrate 10 are in this case made particularly thin, since the carrier substrate here is advantageously used as an additional spacer layer for forming the first optically variable effect and, consequently, the layer thickness of the layer 13 can be chosen to be particularly thin.

Furthermore, it is also possible here for the decorative layer 12 not to be part of a film element applied onto the carrier substrate 10, rather for the decorative layer 12 to be applied directly to the carrier substrate 10 by means of a printing method.

The advantages already described above are obtained by means of the multilayer body 3.

Figure 4:
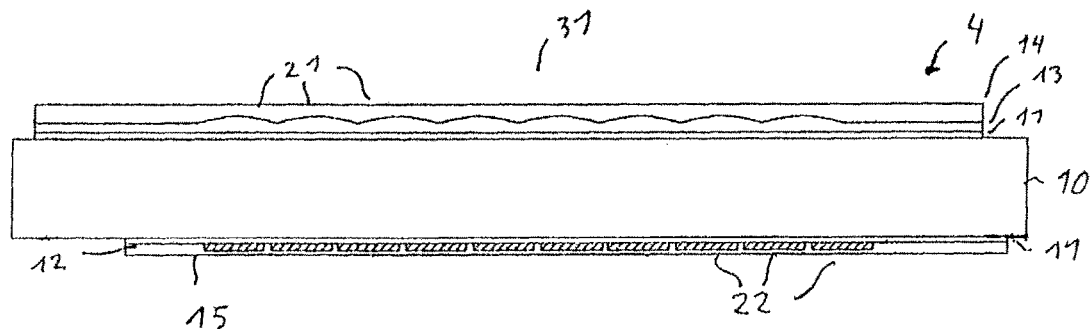
FIG. 4 shows a schematic sectional illustration of a multilayer body.

FIG. 4 shows a multilayer body 4 constituting a modification of the multilayer body 3 according to FIG. 3. The multilayer body 4 comprises the carrier substrate 10, the adhesive layers 11, the decorative layer 12 with the microimages 22, the transparent layer 13 with the microlenses 21, and the protective lacquer layer 15. The multilayer body 4 is configured like the multilayer body 3 according to FIG. 3 with the difference that the carrier substrate 10 is embodied in completely transparent fashion, and that a replication lacquer layer 14 is arranged above the transparent layer 13, the refractive index of said replication lacquer layer differing from the refractive index of the material of the layer 13. The film element applied to the front side of the carrier substrate 10 is in this case preferably produced as follows:

The replication lacquer layer 14 is applied to an optional carrier layer and release layer (in the case of a transfer film) and a surface relief corresponding to the microlens grid with the microlenses 21 is embossed into the replication lacquer layer 14. Afterward, said surface relief is filled with a further lacquer layer, the layer 13, and the further layers, in particular the adhesive layer 11, are then applied. Afterward, the film element is applied onto the carrier substrate 10. The embodiment according to FIG. 4 here has the further advantage that the surface structure of the microlenses 21 is not impressed in the front side, that is to say the upper surface, of the multilayer body and therefore cannot be reproduced by means of a contact copy. Furthermore, the microlenses are thus protected against mechanical wear, for example scratches, by the layer 14, such that the durability of the multilayer body is improved.

Figure 5:
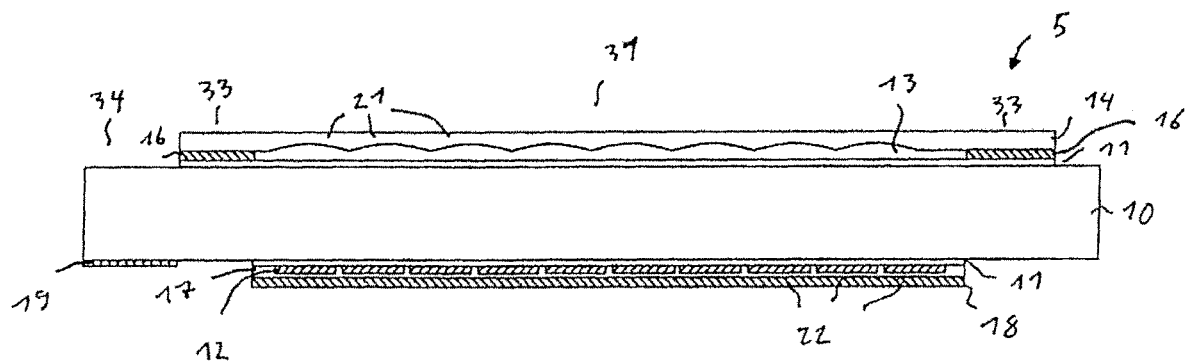
FIG. 5 shows a schematic sectional illustration of a multilayer body.

FIG. 5 shows a multilayer body 5 constituting a further variation of the multilayer body 3 and of the multilayer body 4 according to FIG. 3 and FIG. 4, respectively. The multilayer body 5 comprises the carrier substrate 10, the layer 11, the decorative layer 12 with the microimages 22, the layer 13 with the microlenses 21, and the layer 14. The multilayer body 5 is embodied like the multilayer body 4 according to FIG. 4 with the difference that the film element applied onto the front side of the carrier substrate 10 furthermore has a security element 16, the film element applied onto the underside of the carrier substrate has a security element 18 and a cover layer 17, and the underside of the carrier substrate 10 is provided with an imprint 19.

The cover layer 17 is formed by an opaque layer which decouples the optical effect of the decorative layer 12 and the optical effect of the security element 18 from one another. This layer could also be dispensed with. The security elements 16 and 18 each consist of one or a plurality of layers, selected from the group comprising replication lacquer layer with impressed optically active surface relief, reflection layer, metal layer, color lacquer layer, layer comprising optically active pigments, liquid crystal layer, volume hologram layer and thin-film layer system. In this case, the security element 18 preferably forms a second optically variable information item, which differs from the first optically variable information item generated in the region 31 by the layers 13, 15 and 12. Upon viewing from the front side, the optically variable effect generated by the layers 12 and 13 is thus visible in the region 31 and, upon viewing from the rear side, the optically variable effect generated by the security element 18 is visible.

The security element 16 can be configured like the security element 18. The security element 16 thus generates a corresponding, preferably optically variable impression in a region 33, in which it is provided in the film element applied with the front side of the carrier substrate 10, upon viewing from the front side. Furthermore, the security feature 16 is arranged with register accuracy with respect to the security element 18. Upon transmitted-light viewing, the security elements 16 and 18 complement one another to form a further security element, for example form mutually complementary representations which combine to form an overall motif, for example, upon transmitted-light viewing. Part of said overall motif is furthermore the imprint 19, which is likewise arranged with register accuracy with respect to the security elements 16 and 18. Upon viewing from the front and rear sides in reflected light, preferably the optically variable effect generated by the security element 16 is thus manifested in the region 33 and, upon viewing in transmitted light, the "watermark effect" provided by the imprint 19, the security element 16 and the security element 18 is manifested in the regions 31, 33 and 34, said "watermark effect" being determined by the register-accurate arrangement of the layers of the security elements 16 and 18 and of the imprint 19 with respect to one another.

Figure 6:
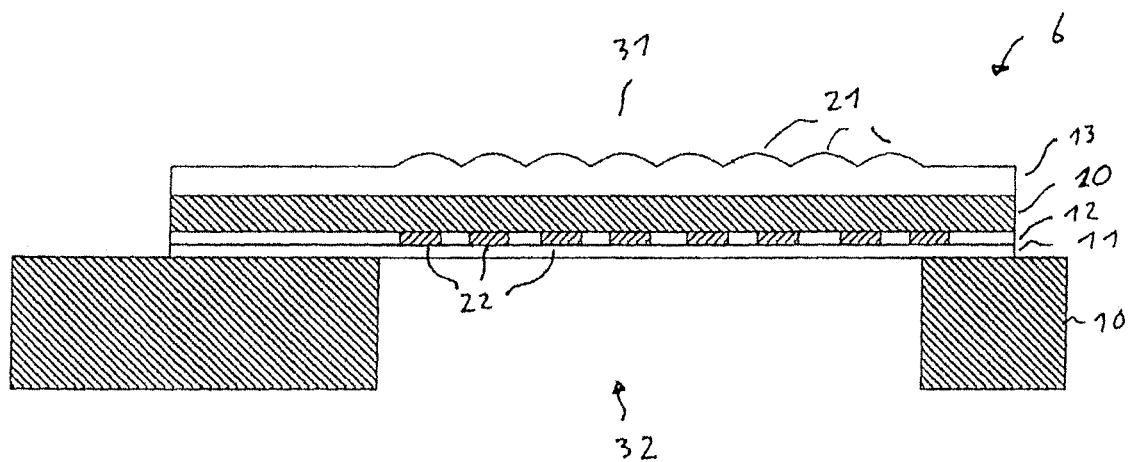
FIG. 6 shows a schematic sectional illustration of a multilayer body.

FIG. 6 shows a multilayer body 6 comprising the carrier substrate 10, the adhesive layer 11, the decorative layer 12 with the microimages 22 arranged in the region 31, and the transparent layer 13 with the microlenses 21 arranged in the region 31. The abovementioned layers are embodied like the correspondingly designated layers of the multilayer body 1 and 2 according to FIG. 1a to FIG. 2 with the difference that, in the region 31, a window-shaped perforation is additionally provided in the carrier substrate 10. With regard to the configuration of these layers, reference is thus made to the explanations above. Furthermore, a translucent layer 20 is arranged between the decorative layer 12 and the transparent layer 13. The translucent layer 20 preferably consists of a colored lacquer layer and preferably has a layer thickness of between 1 μm and 30 μm.

Furthermore, the decorative layer is embodied such that the transparency of the decorative layer is different in the image regions and in the background regions; by way of example, the background regions are configured in fully transparent fashion and the image regions are configured in opaque fashion.

What is achieved by the above-described configuration of the multilayer body 6 is that the optically variable effect generated in the region 31 by the layers 12 and 13 is manifested only in transmitted-light viewing and is extinguished in reflected-light viewing by the translucent layer 20 and the scattering effect brought about by the latter.

Figure 7:
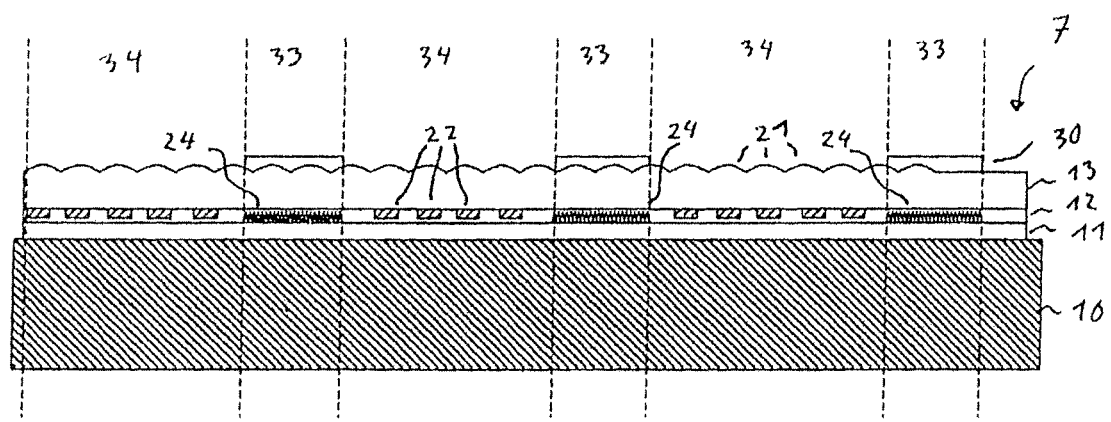
FIG. 7 shows a schematic sectional illustration of a multilayer body.

FIG. 7 shows a multilayer body 7 comprising the carrier substrate 10, the adhesive layer 11, the decorative layer 12 and the transparent layer 13. These layers are embodied like the correspondingly designated layers according to FIG. 1a to FIG. 2, apart from the following differences:

The decorative layer 12 has zones 34 and 33 in the region 31. In the zones 33, the decorative layer 12 is configured in the manner described above with respect to FIG. 1 or FIG. 2. In the zones 33, the decorative layer 12 has a replication lacquer layer having an optically active surface structure 24, which is provided for generating a further optically variable information item, which differs from the first optically variable information item generated in the zones 34. Furthermore, in the zones 33, a lacquer layer 30 is printed onto the surface of the transparent layer 13. The lacquer layer 30 is a lacquer layer composed of a material whose refractive index differs from the refractive index of the material of the transparent layer by not more than 0.3. This has the effect that the optical effect of the microlenses 21 is extinguished in the zones 33 for the human observer and only the optically variable effect generated by the optically active surface structure 24 thus becomes visible in the zones 33 for the human observer.

A further variant for obtaining the optical effect generated by the multilayer body 7 is explained below with reference to FIG. 8.

Figure 8:
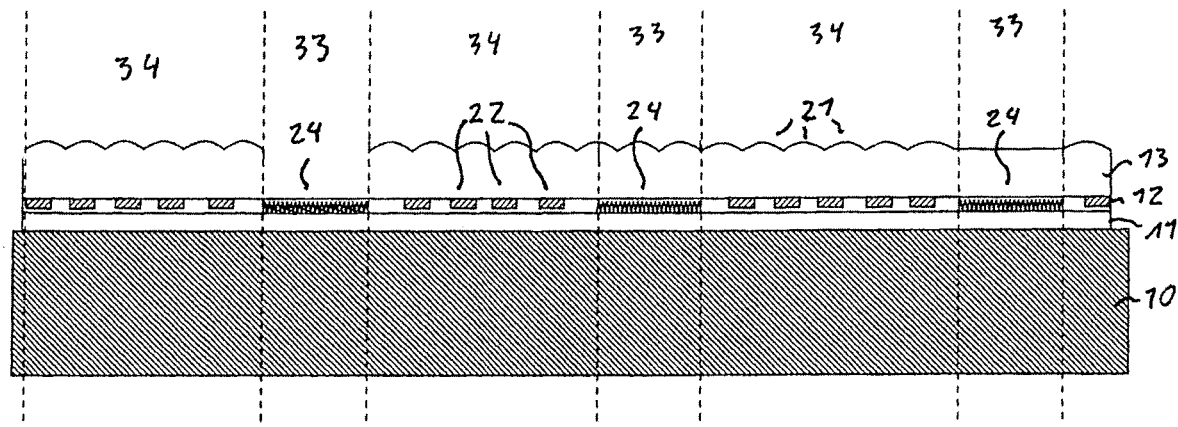
FIG. 8 shows a schematic sectional illustration of a multilayer body.

FIG. 8 shows a multilayer body 8, comprising the carrier substrate 10, the adhesive layer 11, the decorative layer 12 and the transparent layer 13. These layers are constructed like the correspondingly designated layers according to FIG. 7 apart from the following differences: instead of extinguishing the optical effect of the microlenses 21 in the zones 33, here firstly the variant is shown where the layer 13 is not provided in the region of the zones 33. The layer 13 is thus fashioned partially, such that the layer 13 with the microlenses 21 is not provided in the zones 33 or in a portion of the zones 33. As a result, the optically variable effect of the optically active surface structures 24 is manifested particularly brilliantly in these regions 33 because there is no or only partial covering of the optically variable effect by other layers. As an alternative thereto, it is possible for the microlenses to be impressed only partially into the layer 13. As shown in FIG. 8, the microlenses are thus not impressed in the zones 33 and, by way of example, as shown in FIG. 8, are replaced by a planar surface profile or a substantially smooth or planar surface profile without an optical distortion function.

Alternatively, investigations have shown that even when dispensing with the lacquer layer 30 or when implementing one of the two preceding measures, the optical impression of the surface structure, particularly when a Kinegram® is used, is only slightly blurred by the lenses and it is thus possible, if appropriate, to dispense with the lacquer layer 30 or one of the two abovementioned alternatives thereto for obtaining the optically variable effect outlined in the exemplary embodiment according to FIG. 7.

It is furthermore possible that as zones 34 regions having differently embodied and/or oriented microimage grid and microstructure grid, as illustrated previously in FIGS. 1b, 1c, 1d, 1e, and zones 33 for generating a further optically variable information item are arranged adjacent to one another alongside one another.

Adjacent in this context means that zones respectively lying alongside one another have a common boundary line or boundary zone. In order to be able to compensate for the presence of manufacturing tolerances of the positions of the respective zones, it is possible for zones respectively lying alongside one another to slightly overlap one another in an overlap region embodied as a boundary zone, wherein the boundary zone is in each case preferably slightly wider than the maximum manufacturing tolerance, for example has a width of between 10 μm and 5 mm. Boundary zones can be provided at the entire periphery of a zone or only at part of the periphery, for example only in the region of a boundary line with respect to an adjacent zone. Such manufacturing tolerances can occur for example when applying the individual layers in different production steps, preferably in a roll-to-roll process for the microimage grids and/or of the microstructure grids, as a result of which a small offset in the relative arrangement of the layers with respect to one another can arise.

Figure 9:
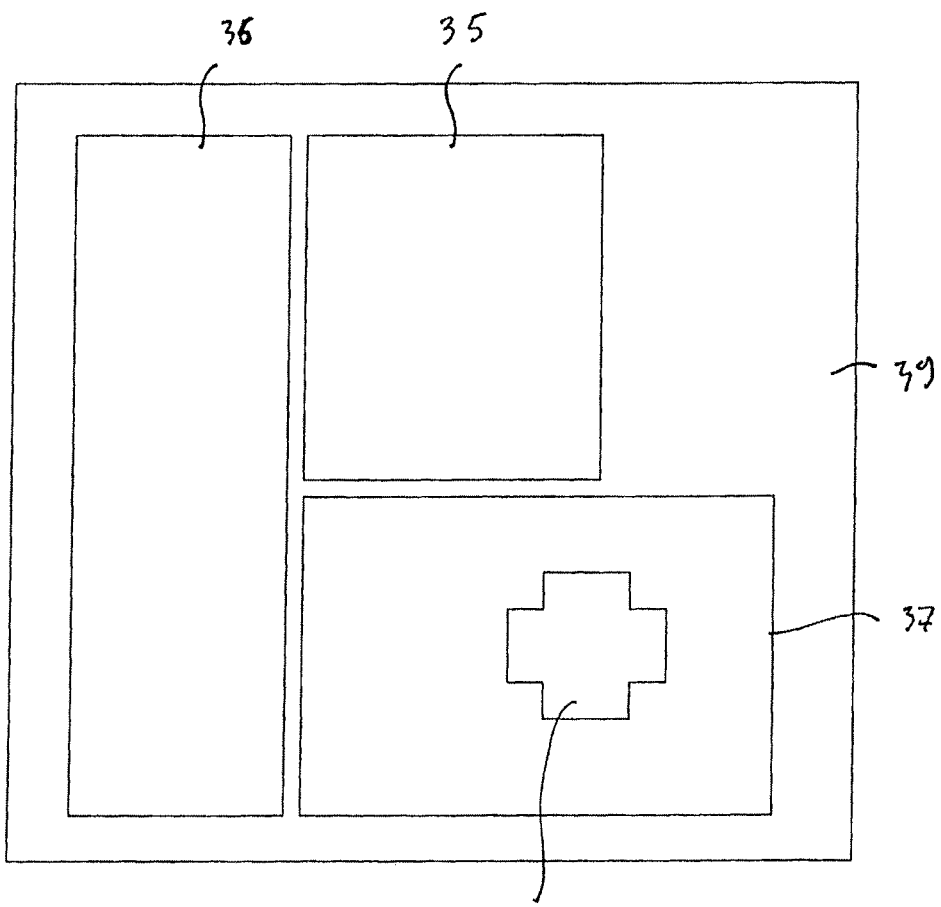
FIG. 9 shows a schematic plan view of a multilayer body.

FIG. 9 shows a multilayer body 9 comprising the regions 35, 36 and regions 37 and 38. In the regions 35 to 38, the microimage grid and the microstructure grid respectively differ from one another, in particular in one of the parameters selected from the group comprising microimage distance, microstructure distance and orientation of the coordinate axis which are spanned by the microstructure grid and the microimage grid. The microimage grid or the microstructure grid can also be identical in individual regions 35 to 38, but phase-shifted relative to the respective other regions. In the regions 37 and 38, by way of example, the zones 21, 22 and 23 are thus arranged in accordance with a microstructure grid and a microimage grid, in which the difference between the microimage distance and the microstructure distance is positive in the region 134 and negative in the region 135. By way of example, this brings about a contrary movement of the motif manifested during tilting in the regions 37 and 38.

In addition, an advantageous combination of zones 34 having optically variable information items with adjacent zones 33 having an optically variable information item contrasting therewith is possible, for example as individual motifs within an overall motif, in order that the zones 33 can serve as a contrasting optical reference to the optically variable information item in the zones 34. By way of example, there can be movement effects in the regions 35 to 38 and a surrounding region 39 without a movement effect or a movement effect in the region 38 with a region 37 surrounding or adjoining the latter without a movement effect, for example with a hologram and/or with optically variable pigments or else in each case contrary movement effects in the regions 35 to 38. Contrasting optically variable information items can also be generated, for example, by virtue of the fact that, in one or a plurality of regions 35 to 38, a microstructure grid is provided above a microimage grid or above other optically variable motifs and, in other regions 35 to 38 directly or indirectly adjacent thereto, the microstructure grid is either extinguished, for example by means of a lacquer layer having a similar refractive index, or is not provided. It is likewise possible to provide in the regions 35 to optically variable information items adjacent with optically static information items, for example single-colored regions or multicolored, non-optically variable motifs, adjacent to one another.

The invention claimed is:

1. A multilayer body comprising:
   a transparent first layer including a multiplicity of microlenses spatially arranged to form a microlens grid having a grid pitch, said microlenses being impressed in a first surface area of the transparent first layer; and
   a second layer, which is arranged below the first layer and in a fixed position with respect to the first layer and has a multiplicity of microimages spatially arranged to form a microimage grid having a grid pitch, each microimage being in an at least partial overlap with one of the microlenses of the microlens grid for generating a first optically variable information item,
   wherein the grid pitch of the microimage grid and the grid pitch of the microlens grid in at least one spatial direction are each less than 300 μm, and
   wherein the grid pitch of the microlens grid in a first spatial direction is greater by more than 100%, than a dimension of each microlens of the microlens grid in the first spatial direction, and
   wherein flat regions are provided between the microlenses such that the microlenses do not directly succeed one another, and
   wherein the grid pitch of the microimage grid and the grid pitch of the microlens grid differ from one another for adjacent microimages and microlenses by between 0.5 and 5%.

2. The multilayer body as claimed in claim 1, wherein a maximum structure height of each microlens of the microlens grid is at least 50%, of the dimension of each microlens of the microlens grid in the first spatial direction.

3. The multilayer body as claimed in claim 1, wherein a dimension of each microimage of the microimage grid in the first spatial direction is more than 100%, of an adjacent microlens in the first spatial direction.

4. The multilayer body as claimed in claim 1, wherein the multilayer body has a carrier substrate having a layer thickness of more than 6 μm, and wherein the carrier substrate is embodied in transparent fashion in a second region or has a perforation in a second region, wherein the second region covers the first surface area, and wherein the first layer is arranged on a front side of the carrier substrate and the second layer is arranged on a rear side of the carrier substrate.

5. The multilayer body as claimed in claim 4, wherein the multilayer body is a banknote, and wherein the carrier substrate has a layer thickness of 30 μm to 200 μm.

6. The multilayer body as claimed in claim 4, wherein the multilayer body has a third layer, which is arranged below the second layer and which, when the multilayer body is viewed from the rear side, generates a second optically variable information item, which differs from the first optically variable information item.

7. The multilayer body as claimed in claim 1, wherein the multilayer body has a translucent layer arranged between the first layer and the second layer.

8. The multilayer body as claimed in claim 7, wherein the multilayer body has a carrier substrate, which is embodied in transparent fashion in a first region or has a perforation in a first region.

9. The multilayer body as claimed in claim 1, wherein the second layer has at least one first zone underlying said first surface area, in which the microimages are provided, and has at least one second zone underlying said first surface area, in which optically active surface structures for generating a second optically variable information item are provided, said second optically variable information item differing from the first optically variable information item.

10. The multilayer body as claimed in claim 9, wherein the microlenses are provided in the first and second zones.

11. The multilayer body as claimed in claim 9, wherein, in the at least one second zone, a lacquer layer is printed, onto the first layer, the lacquer layer having a refractive index and the first layer having a refractive index, the refractive index of said lacquer layer differing from the refractive index of the first layer by less than 0.3.

12. The multilayer body as claimed in claim 9, wherein at least one second zone has a smallest dimension of more than 300 μm and is shaped in a pattern for generating an information item in addition to the first and second optically variable information items.

13. The multilayer body as claimed in claim 9, wherein the first surface area of the transparent first layer is subdivided into a multiplicity of first and second zones, and wherein the first and second zones are spatially arranged to form a grid having a grid pitch of less than 300 μm in at least one spatial direction.

14. The multilayer body as claimed in claim 1, wherein each of the microimages is formed by one or a plurality of image regions surrounded by a background region.

15. The multilayer body as claimed in claim 14, wherein the one or the plurality of image regions is or are opaque and the background region is transparent, or vice versa.

16. The multilayer body as claimed in claim 14, wherein the one or the plurality of image regions and the background region have different reflection properties.

17. The multilayer body as claimed in claim 14, wherein the second layer has a metallic layer, a colored lacquer layer and/or a photoresist layer which is provided in the image regions and is not provided in the background region, or vice versa.

18. The multilayer body as claimed in claim 14, wherein the image regions and the background region are covered with different optically variable elements.

19. The multilayer body as claimed in claim 18, wherein the second layer has a replication lacquer layer having a surface relief impressed into a surface of the replication lacquer layer.

20. The multilayer body as claimed in claim 14, wherein the one or the plurality of image regions and the background region have different polarization properties.

21. The multilayer body as claimed in claim 14, wherein a color, a reflection property or an absorption property of the second layer is varied within the image regions.

22. The multilayer body as claimed in claim 1, wherein the microlens grid is arranged in a manner rotated by 45° relative to a longitudinal axis of the multilayer body.

23. The multilayer body as claimed in claim 22, wherein the microlens grid is a one-dimensional microlens grid and the microlenses have focal point lines that are arranged in a manner rotated by 45° relative to the longitudinal axis of the multilayer body.

24. The multilayer body as claimed in claim 1, wherein each of the microimages is applied on a curved surface.

25. The multilayer body as claimed in claim 1, wherein the microlens grid is a two-dimensional microlens grid.

26. The multilayer body as claimed in claim 1, wherein each microimage of the microimage grid and two or more microlenses or microimages succeed one another in a first spatial direction with a respective grid pitch of between 5 µm and 300 µm.

27. The multilayer body as claimed in claim 1, wherein, in a first region, the grid pitch of the microlens grid and/or of the microimage grid and/or a rotation of the microimage grid and of the microlens grid relative to one another are/is varied continuously in accordance with a parameter variation function in at least one spatial direction.

28. The multilayer body as claimed in claim 27, wherein the microimage grid has in the first region at least two microimages which differ from one another.

29. The multilayer body as claimed in claim 1, wherein, in a second region, the microimage has a form and a color, wherein at least one of the form or the color of the microimage is varied continuously in accordance with a transformation function.

30. The multilayer body as claimed in claim 1, wherein, in a first partial region of the first surface area, the grid pitch of the microlens grid, the grid pitch of the microimage grid and/or a rotation of the microimage grid and of the microlens grid with respect to one another differs from the grid pitch of the microlens grid, the grid pitch of the microimage grid and/or a rotation of the microimage grid and of the microlens grid relative to one another in a second partial region of the first surface area.

31. A multilayer body comprising:
a transparent first layer including a multiplicity of microlenses spatially arranged to form a microlens grid having a grid pitch, said microlenses being impressed in a first surface area of the transparent layer; and
a second layer, which is arranged below the first layer and in a fixed position with respect to the first layer and has a multiplicity of microimages spatially arranged to form a microimage grid having a grid pitch, each microimage being in an at least partial overlap with one of the microlenses of the microlens grid for generating a first optically variable information item,
wherein the grid pitch of the microimage grid and the grid pitch of the microlens grid in at least one spatial direction are less than 300 µm, and
wherein each microimage is formed by one or a plurality of image regions surrounded by a background region, the image regions and the background region being coplanar and adjacent to each other, and
wherein the background region is formed by at least one of: a metallic layer; a colored lacquer layer; and a photoresist layer, and wherein none of the metallic layer, the colored lacquer layer or the photoresist layer is provided in the plurality of image regions, and
wherein the grid pitch of the microimage grid and the grid pitch of the microlens grid differ from one another for adjacent microimages and microlenses by between 0.5 and 5%.

32. A multilayer body comprising:
a transparent first layer including a multiplicity of microlenses spatially arranged to form a microlens grid having a grid pitch, said microlenses being impressed in a first surface area of the transparent first layer; and
a second layer, which is arranged below the first layer and in a fixed position with respect to the first layer and has a multiplicity of microimages spatially arranged to form a microimage grid having a grid pitch, each microimage being in an at least partial overlap with one of the microlenses of the microlens grid for generating a first optically variable information item,
wherein the grid pitch of the microimage grid and the grid pitch of the microlens grid in at least one spatial direction are each less than 300 µm, and
wherein the grid pitch of the microlens grid in a first spatial direction is greater by more than 100%, than a dimension of each microlens of the microlens grid in the first spatial direction, and
wherein flat regions are provided between the microlenses such that the microlenses do not directly succeed one another, and
wherein the microimage grid and the microlens grid are arranged in a manner rotated by between 0.5° and 50° relative to one another.

33. A multilayer body comprising:
a transparent first layer including a multiplicity of microlenses spatially arranged to form a microlens grid having a grid pitch, said microlenses being impressed in a first surface area of the transparent layer; and
a second layer, which is arranged below the first layer and in a fixed position with respect to the first layer and has a multiplicity of microimages spatially arranged to form a microimage grid having a grid pitch, each microimage being in an at least partial overlap with one of the microlenses of the microlens grid for generating a first optically variable information item,
wherein the grid pitch of the microimage grid and the grid pitch of the microlens grid in at least one spatial direction are less than 300 µm, and
wherein each microimage is formed by one or a plurality of image regions surrounded by a background region, the image regions and the background region being coplanar and adjacent to each other, and
wherein the background region is formed by at least one of: a metallic layer; a colored lacquer layer; and a photoresist layer, and wherein none of the metallic layer, the colored lacquer layer or the photoresist layer is provided in the plurality of image regions, and
wherein the microimage grid is rotated by between 0.5° and 50° with respect to the microlens grid.

34. A multilayer body comprising:
a transparent first layer including a multiplicity of microlenses spatially arranged to form a microlens grid having a grid pitch, said microlenses being impressed in a first surface area of the transparent layer; and a second layer, which is arranged below the first layer and in a fixed position with respect to the first layer and has a multiplicity of microimages spatially arranged to form a microimage grid having a grid pitch, each microimage being in an at least partial overlap with one of the microlenses of the microlens grid for generating a first optically variable information item, wherein the grid pitch of the microimage grid and the grid pitch of the microlens grid in at least one spatial direction are less than 300 μm, and wherein each microimage is formed by one or a plurality of image regions surrounded by a background region, the image regions and the background region being coplanar and adjacent to each other, and wherein the image regions are formed by at least one of: a metallic layer; a colored lacquer layer; and a photoresist layer, and wherein none of the metallic layer, the colored lacquer layer or the photoresist layer is provided in the background region, and wherein the grid pitch of the microimage grid and the grid pitch of the microlens grid differ from one another for adjacent microimages and microlenses by between 0.5 and 5%.

35. A multilayer body comprising:

a transparent first layer including a multiplicity of microlenses spatially arranged to form a microlens grid having a grid pitch, said microlenses being impressed in a first surface area of the transparent layer; and a second layer, which is arranged below the first layer and in a fixed position with respect to the first layer and has a multiplicity of microimages spatially arranged to form a microimage grid having a grid pitch, each microimage being in an at least partial overlap with one of the microlenses of the microlens grid for generating a first optically variable information item, wherein the grid pitch of the microimage grid and the grid pitch of the microlens grid in at least one spatial direction are less than 300 μm, and wherein each microimage is formed by one or a plurality of image regions surrounded by a background region, the image regions and the background region being coplanar and adjacent to each other, and wherein the image regions are formed by at least one of: a metallic layer; a colored lacquer layer; and a photoresist layer, and wherein none of the metallic layer, the colored lacquer layer or the photoresist layer is provided in the background region, and wherein the microimage grid is rotated by between 0.5° and 50° with respect to the microlens grid.

* * * * *